No. 844,945. PATENTED FEB. 19, 1907.
V. LE BEAU.
BAIT TRAP AND HOLDER.
APPLICATION FILED JULY 6, 1906.
2 SHEETS—SHEET 1.
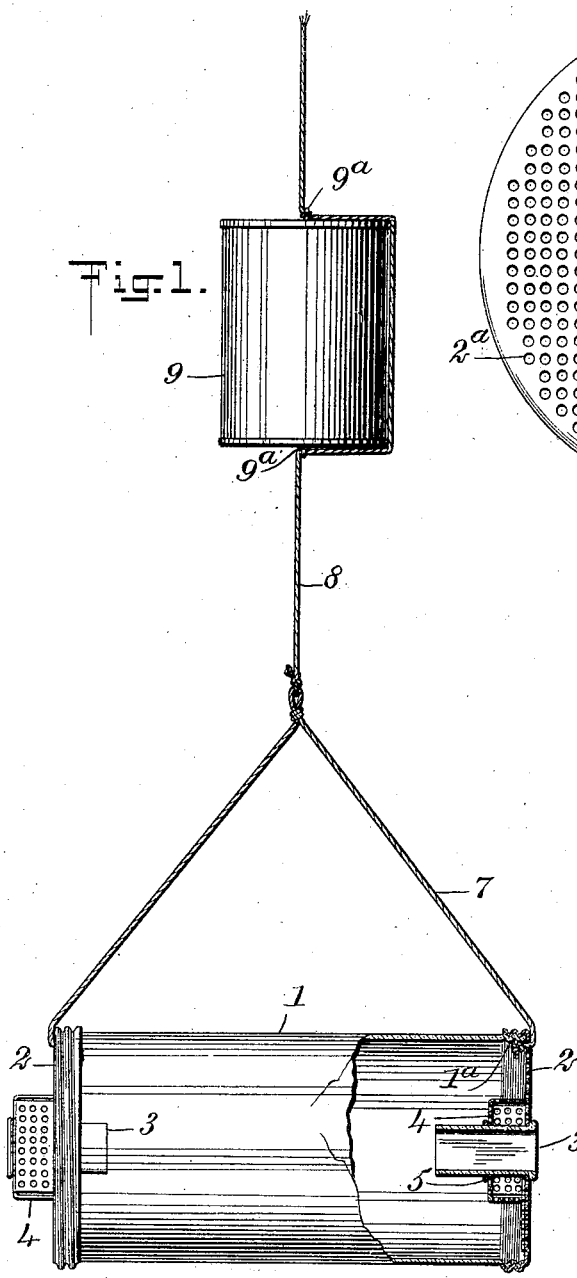
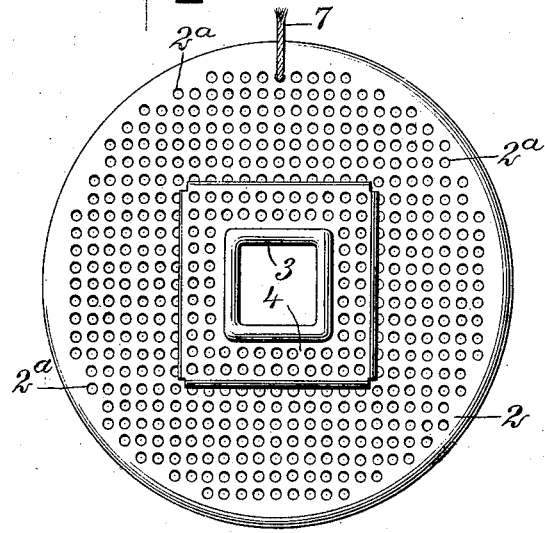
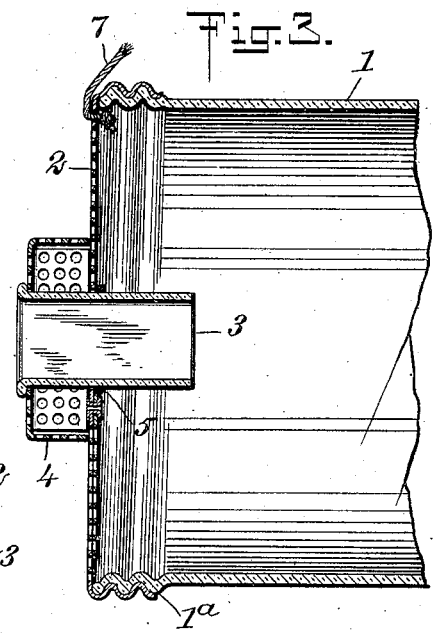
WITNESSES
INVENTOR
Victor Le Beau
BY
ATTORNEYS No. 844,945. PATENTED FEB. 19, 1907.
V. LE BEAU.
BAIT TRAP AND HOLDER.
APPLICATION FILED JULY 6, 1906.
2 SHEETS—SHEET 2.
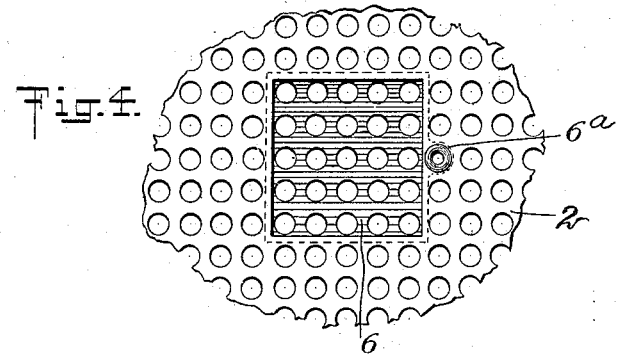
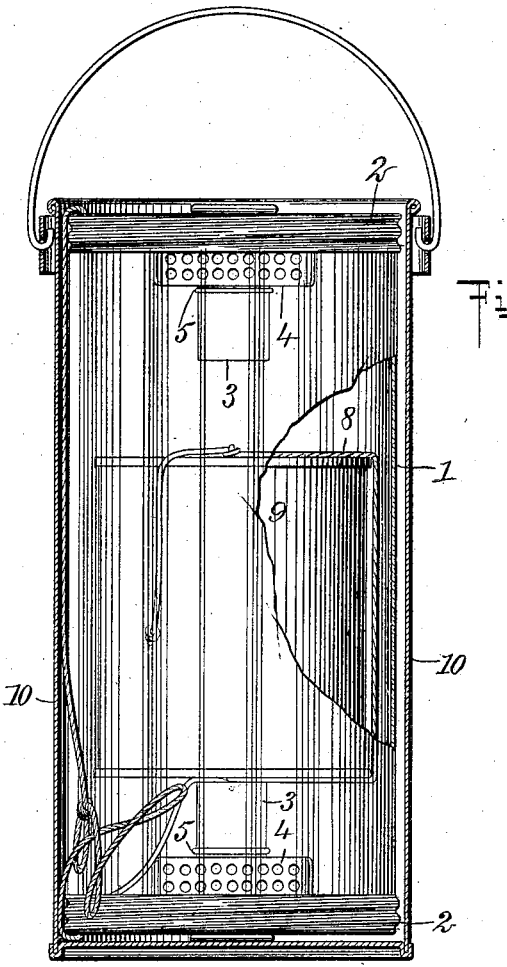
WITNESSES
INVENTOR
Victor Le Beau
BY Munn & Co
ATTORNEYS

UNITED STATES PATENT OFFICE.

VICTOR LE BEAU, OF NEW ORLEANS, LOUISIANA.

BAIT TRAP AND HOLDER.

No. 844,945.

Specification of Letters Patent.

Patented Feb. 19, 1907.

Application filed July 6, 1906. Serial No. 324,967.

*To all whom it may concern:*

Be it known that I, VICTOR LE BEAU, a citizen of the United States, and a resident of New Orleans, in the parish of Orleans and State of Louisiana, have invented a new and Improved Bait Trap and Holder, of which the following is a full, clear, and exact description.

My invention relates to bait traps and holders, and has for its object to provide means for storing food adapted to attract minnows, to hold said food compactly and in good condition so as not to be effected by the currents or when raising the trap out of the water, and also to provide means whereby the live bait is permitted to readily enter the trap and be retained therein. This I accomplish by the means illustrated in the accompanying drawings, in which drawings like characters of reference indicate like parts throughout the views, and in which—

Figure 1 is a side elevation, partly broken away, of a trap embodying my invention connected with a float adapted to support the holder. Fig. 2 is an end view of the holder. Fig. 3 is a vertical longitudinal section of one end of the holder broken away. Fig. 4 is a plan view of a portion of a cover, showing one of the modifications of my invention; and Fig. 5 is a side elevation, partly broken away, of a bait-trap embodying my invention inclosed in a bait-pail and itself inclosing a float adapted to support the trap.

As illustrated in the drawings, 1 represents a cylinder composed of glass or other transparent material, having heads 2 adapted to be detachably secured to the cylinder, preferably by means of a screw-flange adapted to engage a thread 1ª, formed on the end of the cylinder. The heads 2 are provided with perforations 2ª and with a central aperture, preferably rectangular in form, adapted to engage a sleeve 3, preferably rectangular in cross-section. This sleeve 3 extends through a food-chamber 4 and projects into the interior of the cylinder and is made of glass or other transparent material. The food-chamber 4 is made in the form of a box perforated on its sides and bottom. This chamber may be secured on the outside of the head of the cylinder, as shown in Fig. 3, and held in place by means of a flange formed on the end of the tube 3. An elastic band 5 may be applied to the tube on the inner side of the head, so as to hold the parts securely in position. The food-chamber may also be arranged against the inner side of the heads 2, as shown in Fig. 1. In such case the rubber band 5 may be applied to the tube adjacent to the food-chamber to clamp the parts securely together. One of the cylinder-heads may, if desired, be provided with a central cover 6, secured to the head by means of a pivot 6ª, so as to close the central aperture formed in the head of the cylinder. A cord 7 is secured at its ends to each of the detachable cylinder-heads and is attached at the central portion to a cord 8, which is tied to the edge of a float 9 by means of a double loop 9ª. By means of such double-loop construction the float 9 may be readily adjusted on the cord 8 by loosening the portion of the cord extending around the float, and when the float is arranged at the desired distance from the cylinder it may be securely fastened to such cord by pulling on the ends of the cord. The float 9 consists of a sealed chamber and is of sufficient buoyancy to support the cylinder 1.

When the parts are in use, the cylinder is held at the desired depth by means of the float 9, and minnows desired to be secured for live bait become attracted by the food in the food-chamber and enter the cylinder through the tube 3. After the minnows enter the cylinder 1 they remain there, attracted by the food in the food-chamber, and are unable to find their way out, for the reason that the tube is transparent and extends a considerable distance into the chamber, so that the opening in the tube is at a distance from the food-chamber. In addition to serving as a trap for minnows this device may be used as a decoy for larger fish by placing the minnows in the cylinder and supporting the cylinder at the desired depth by means of the float 9. In such cases I prefer to remove the tube 3 and cover the opening in the cylinder-head by means of the cap 6. By means of the removable heads on the cylinder the cylinder and float 9 may be so proportioned relatively to each other as to enable the float to be inclosed within the cylinder and the cylinder inclosed within a pail 10, as shown in Fig. 5. This pail serves as a receptacle for carrying the bait to the fishing-ground after it has been obtained and also serves as means for transporting the trap itself.

Having thus described my invention, what I claim as new, and desire to secure by Letters Patent, is—

1. The combination with a cylinder having a transparent body, of perforated heads detachably secured to such cylinder, a perforated food-chamber, and a transparent tube passing through the food-chamber and head of the cylinder, substantially as shown and described.

2. The combination with a cylinder having a transparent body, of perforated heads detachably secured to said cylinder, a perforated food-chamber secured to the cylinder-head, and a transparent rectangular tube extending through said food-chamber and head of the cylinder and extending into the cylinder, substantially as shown and described.

3. The combination with a cylinder having a transparent body, of perforated heads detachably secured to said cylinder, a food-chamber adapted to be detachably secured to the cylinder-head, and a transparent tube extending through said food-chamber and head and into the interior of the cylinder, substantially as shown and described.

4. The combination with a cylinder having a transparent body, of perforated heads detachably secured to said cylinder, a central aperture formed in one of said heads and a perforated cap pivoted to said head and adapted to cover said aperture, substantially as shown and described.

5. The combination with a cylinder having a transparent body, and provided in its end with a screw-thread, of perforated heads provided with a central aperture and having a flange provided with a thread adapted to engage the thread of the cylinder, a cord secured at its ends to each of the cylinder-heads, and a perforated food-chamber adapted to be secured to the cylinder-heads, substantially as shown and described.

6. The combination with a cylinder having a transparent body, of perforated heads detachably secured to said cylinder, a food-chamber adapted to be secured to the cylinder-heads, a transparent tube extending through said chamber and heads into the interior of the cylinder, means for connecting the heads of the cylinders together, a cord connected with said cylinder-heads, and a float adjustably secured to said cord and adapted to be inserted in the interior of the cylinder, substantially as shown and described.

In testimony whereof I have signed my name to this specification in the presence of two subscribing witnesses.

VICTOR LE BEAU.

Witnesses:
THEODOR FREDERICK HARTEL,
JAMES PREVOT.